(12) United States Patent
Lin

(10) Patent No.: US 8,807,579 B2
(45) Date of Patent: Aug. 19, 2014

(54) COMPLEX DEODORIZING TRASH CAN

(71) Applicant: Fei-Peng Lin, Hsinchu (TW)

(72) Inventor: Fei-Peng Lin, Hsinchu (TW)

( * ) Notice: Subject to any disclaimer, the term of this patent is extended or adjusted under 35 U.S.C. 154(b) by 23 days.

(21) Appl. No.: 13/761,184

(22) Filed: Feb. 7, 2013

(65) Prior Publication Data

US 2013/0234409 A1    Sep. 12, 2013

(30) Foreign Application Priority Data

Mar. 12, 2012 (TW) .............................. 101204428 A

(51) Int. Cl.
*B62B 1/00* (2006.01)

(52) U.S. Cl.
USPC ................ 280/47.131; 280/47.17; 280/47.24; 280/47.26; 280/79.11; 280/79.2

(58) Field of Classification Search
USPC ........ 280/47.131, 47.17, 47.24, 47.26, 47.33, 280/79.11, 79.2
See application file for complete search history.

(56) References Cited

U.S. PATENT DOCUMENTS

| | | | | |
|---|---|---|---|---|
| 5,031,796 A | * | 7/1991 | Schafer et al. | 220/571 |
| 5,265,755 A | * | 11/1993 | McArthur et al. | 220/601 |
| 5,899,468 A | * | 5/1999 | Apps et al. | 280/47.26 |
| 6,102,343 A | * | 8/2000 | Grimesey et al. | 248/95 |
| 6,135,057 A | * | 10/2000 | Cummings | 119/165 |
| 6,626,321 B2 | * | 9/2003 | Jaeger | 220/571 |
| 7,121,564 B2 | * | 10/2006 | Hassell | 280/47.26 |
| 7,878,358 B2 | * | 2/2011 | Smudde | 220/23.88 |
| 2008/0246239 A1 | * | 10/2008 | Connor et al. | 280/47.26 |

* cited by examiner

*Primary Examiner* — Hau Phan
*Assistant Examiner* — Bryan Evans
(74) *Attorney, Agent, or Firm* — Leong C. Lei

(57) ABSTRACT

The present invention provides a complex deodorizing trash can characterized in that a housing cover comprises a smaller dispose opening with a lifting cap to facilitate the dispose of smaller garbage and an air vent with a nano-silver gas filter covered by a cover board for exhausting unpleasant odor and preventing bacteria breeding; an anti-fall rod at front of the main housing can prevent it from slipping into a garbage truck; slip-preventing pads at bottom front of the main housing can prevent sliding thereof due to wind or tilted ground; a drainage opening at bottom rear of the main housing comprises a magnetic protruding drain valve and a foot pedal protrusion lift actuator for cleaning purposes; attachment holes on the push mechanism at top rear of the main housing allow two or more trash cans to combine to form a complex trash can combination for the dispose of different types of garbage.

2 Claims, 8 Drawing Sheets

COMPLEX DEODORIZING TRASH CAN

TECHNICAL FIELD OF THE INVENTION

The present invention is related to a trash can with a structural improvement, in particular, to a trash can for outdoor uses and equipped with a hook device to facilitate the pickup by garbage trucks.

DESCRIPTION OF THE PRIOR ART

In the present invention, the term of "trash can" refers to a type of a relatively large trash can for outdoor uses and equipped with a hook device to facilitate the pickup by garbage trucks. Such type of trash can is commonly used in developed countries in regions such as Europe, United Sates and Japan. Recently, this type of trash can is also being used in countries such as Taiwan and China. Nevertheless, this type of trash can is of a stand-alone configuration, which cannot be combined with each other for diverse applications and uses. In addition, as this type of trash can is built to equip with a large cap only and requires users to lift up such large cap of the trash can for disposing trash inside every time, it is very inconvenient to users of younger or elder ages. Furthermore, this type of trash can is often devoid of the structural design of water drainage, which causes difficulties and inconvenience to the cleaning and washing of the internal of the trash can. In view of the above, there is a need for improvements to such aforementioned type of trash can.

SUMMARY OF THE INVENTION

An objective of the present invention is to provide a complex deodorizing trash can with an improved push mechanism equipped with attachment holes provided for a connecting rod to cooperatively combine a multiple of the complex deodorizing trash can in series for diverse uses and applications. In addition, the large housing cover of the complex deodorizing trash can is provided with a small dispose opening having a lifting cap thereon to facilitate the dispose of garbage of small sizes therein, and the complex deodorizing trash can further comprises an air vent equipped with a filter and a cover board to exhaust unpleasant odor out of the trash can. Furthermore, the bottom of the main housing of the complex deodorizing trash can is also provided with a magnetic protruding drain valve configured to be opened by a foot pedal protruding type lift actuator in order to facilitate the water drainage out of the trash can.

To achieve the aforementioned objective of the present invention, a complex deodorizing trash can is advantageously provided with at least the following features and merits. A smaller dispose opening with a lifting cap is provided on a housing cover to facilitate the dispose of garbage of relatively smaller sizes into the trash can. In addition, the housing cover also comprises an air vent equipped with a nano-silver gas filter and a cover board covering thereon such that the filter is able to exhaust the unpleasant odor out of the trash can and to prevent the breeding of bacteria. Furthermore, a front side of the main housing is provided with a slip-preventing rod to prevent accidental slipping of the trash can into a hook-to-dispose type of garbage truck during the pickup of the trash can for garbage dispose. Also, slip-preventing pad are provided at the bottom surface of the main housing and adjacent to the front portion thereof to prevent sliding of the main housing due to the force of the wind or to the tilt of the ground. The rear portion of the bottom of the main housing is provided with a drainage opening equipped with a magnetic-protruding-type drain valve and a foot pedal protruding-type lift actuator to control the closing and opening of the drainage opening such that the cleaning process of the main housing of the complex deodorizing trash can is facilitated. Lastly, attachment holes are provided on the push mechanism arranged on top of the rear portion of the main housing to allow two or more trash cans of the present invention to combine with each other in series with a connecting rod in order to form a complex trash can combination with varying number of trash cans to facilitate various uses and applications thereof including such as recycling of garbage.

DETAILED DESCRIPTION OF THE PREFERRED EMBODIMENTS

Figure 1:
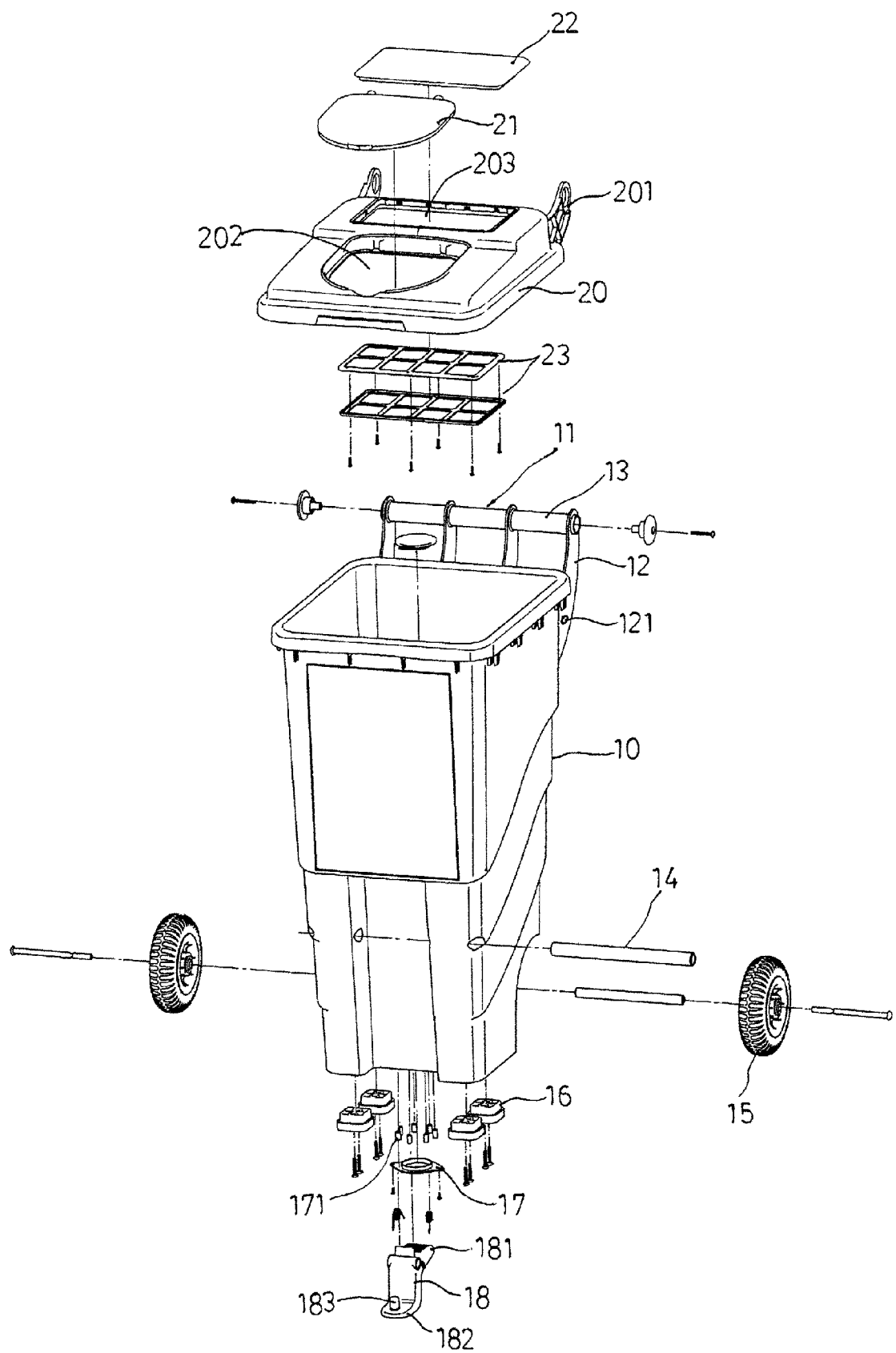
FIG. 1 is an exploded view of the present invention.

As shown in FIGS. 1 to 4, the present invention provides a complex deodorizing trash can comprising a main housing 10, a push mechanism 11, at least one wheel 15, at least one slip-preventing pad 16, a drain valve 17, a lift actuator 18, a housing cover 20, a lifting cap 21 and a cover board 22.

Figure 2:
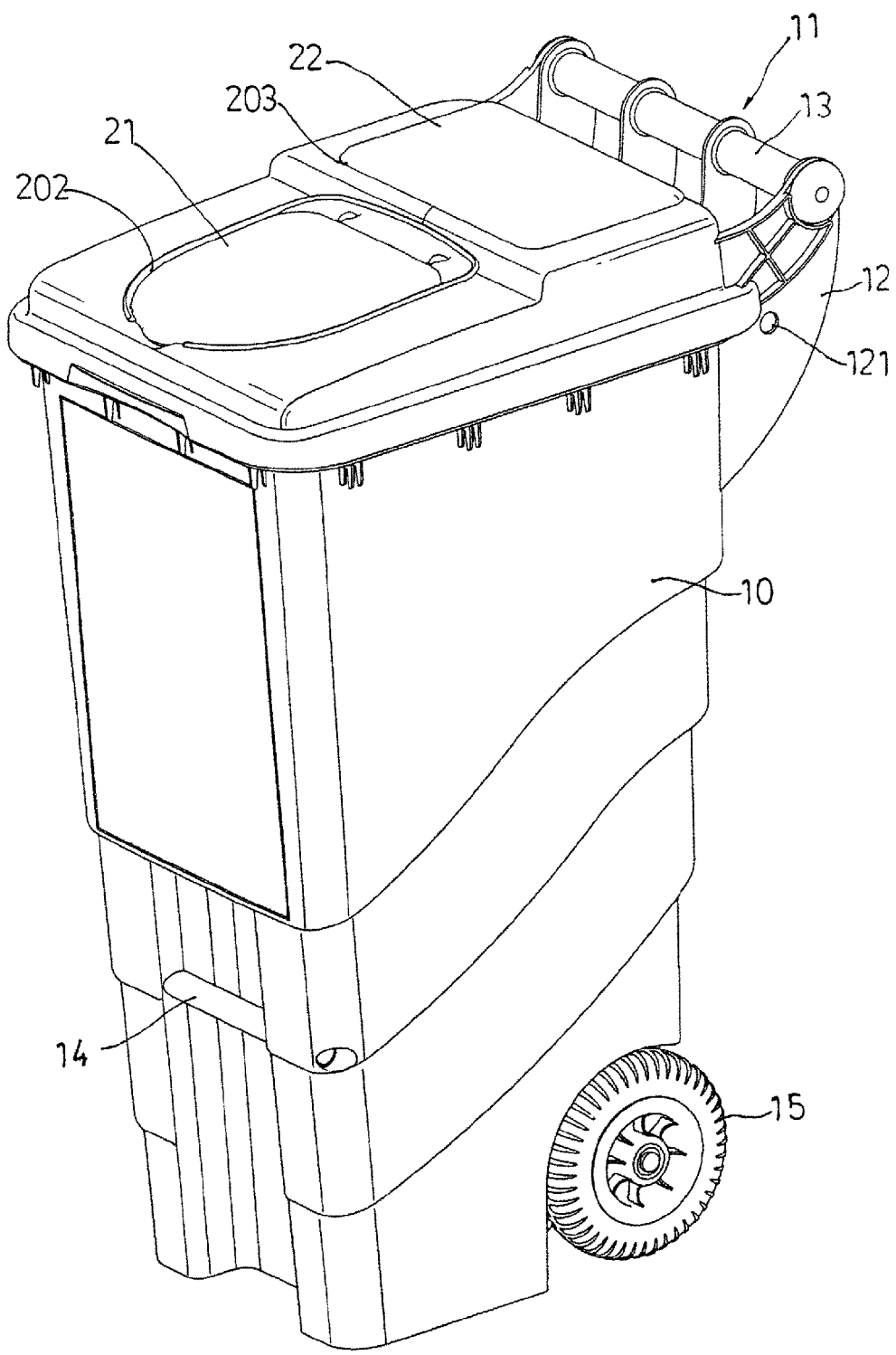
FIG. 2 is a front perspective view of the present invention.
Figure 3:
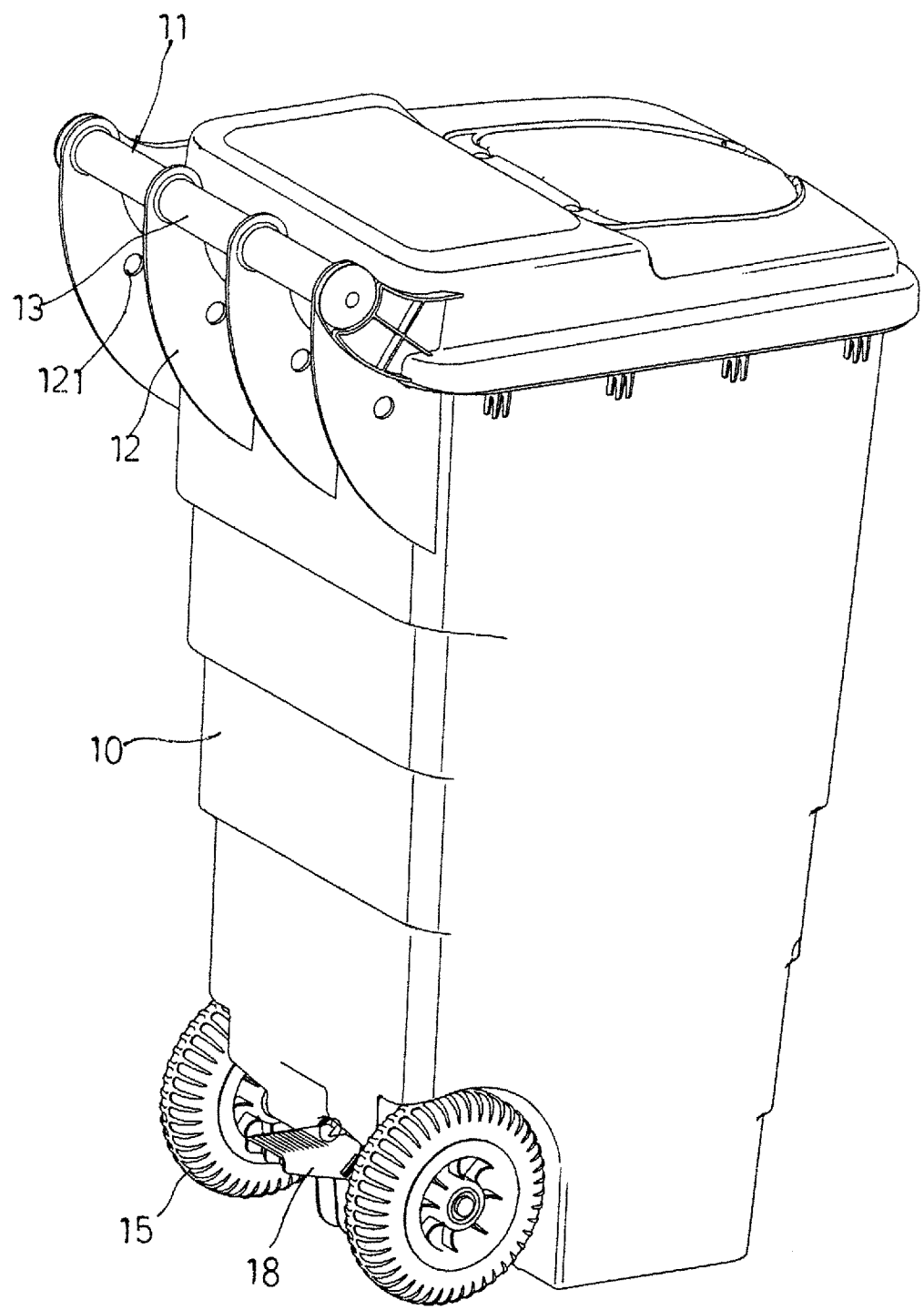
FIG. 3 is a rear perspective view of the present invention.
Figure 4:
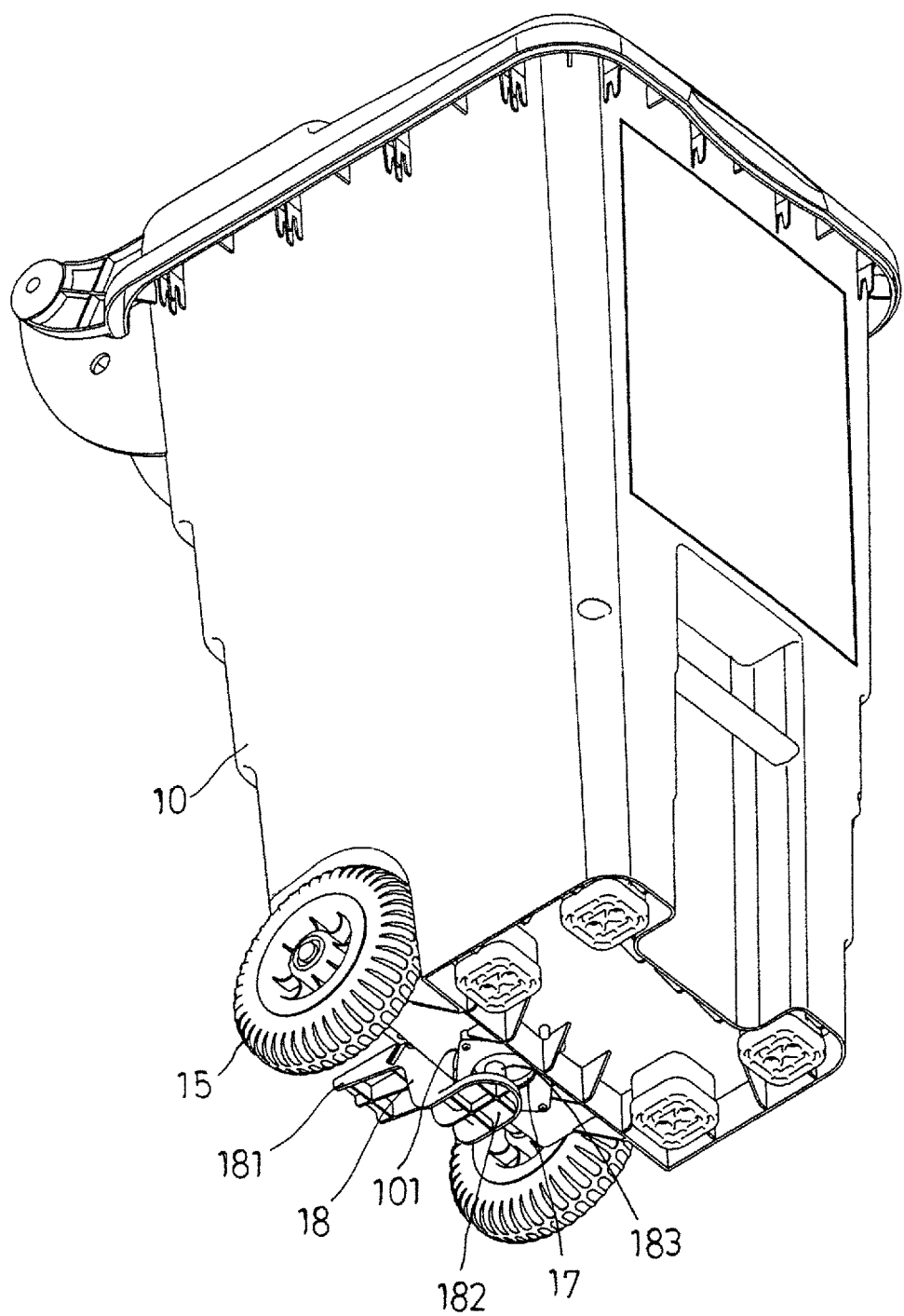
FIG. 4 is a bottom perspective view of the present invention.

Please refer to FIGS. 2 to 4. A shown in the figures, the main housing 10 comprises an opening on a top thereof and the push mechanism 11 is secured to a rear of the main housing 10 and adjacent to a top end thereof. The push mechanism 11 comprises a plurality of securement slats 12 spaced apart from each other and secured onto the main housing 10, and each one of the securement slats 12 comprises an attachment hole 121 arranged on a same location of each one of the securement slats 12 in addition to that a top end of each one of the securement slats is attached to a push rod. A front side of the main housing 10 is provided with a slip-preventing rod 14. The at least one wheel 15, such as a pair of wheels, is mounted with an axle onto a rear side at a bottom of the main housing 10. The at least one slip-preventing pad 16 can be provided in multiple and attached to a bottom surface of the main housing 10. The drain valve 17 comprises a magnet 171 provided on a circumferencing edge thereof to cover a drainage opening 101 provided on the bottom surface of the main housing 10 and to form a magnetic protruding sealing cap. The lift actuator 18 is pivotally attached to a central portion of the axle of the at least one wheel 15 and comprises a food pedal 181 horizontally extended from a top end toward a rear thereof and a lifting plate 182 horizontally extended from a bottom end toward a front thereof The lifting plate 182 comprises a protruding rod 183 formed on a top surface thereof and abutting a bottom surface of the drain valve 17. A rear of the housing cover 20 comprises an attachment board 201 respectively formed on two sides thereof and pivotally attached to the main housing 10 to cover a top surface of the main housing 10 and to form of a rotate-to-flip configuration thereon. The housing cover 20 comprises a smaller dispose opening 202 provided at a front portion thereof and the lifting cap 21 moveably attached thereto for covering the dispose opening 202. In addition, the housing cover 20 further comprises an air vent 203 provided on a top surface and adjacent to a rear portion thereof. The air vent 203 comprises a gas filter 23 with a nano-silver coating thereon and a cover board 22 covering thereon such that a complete assembly of a single unit of the trash can of the present invention is advantageously achieved.

Figure 5:
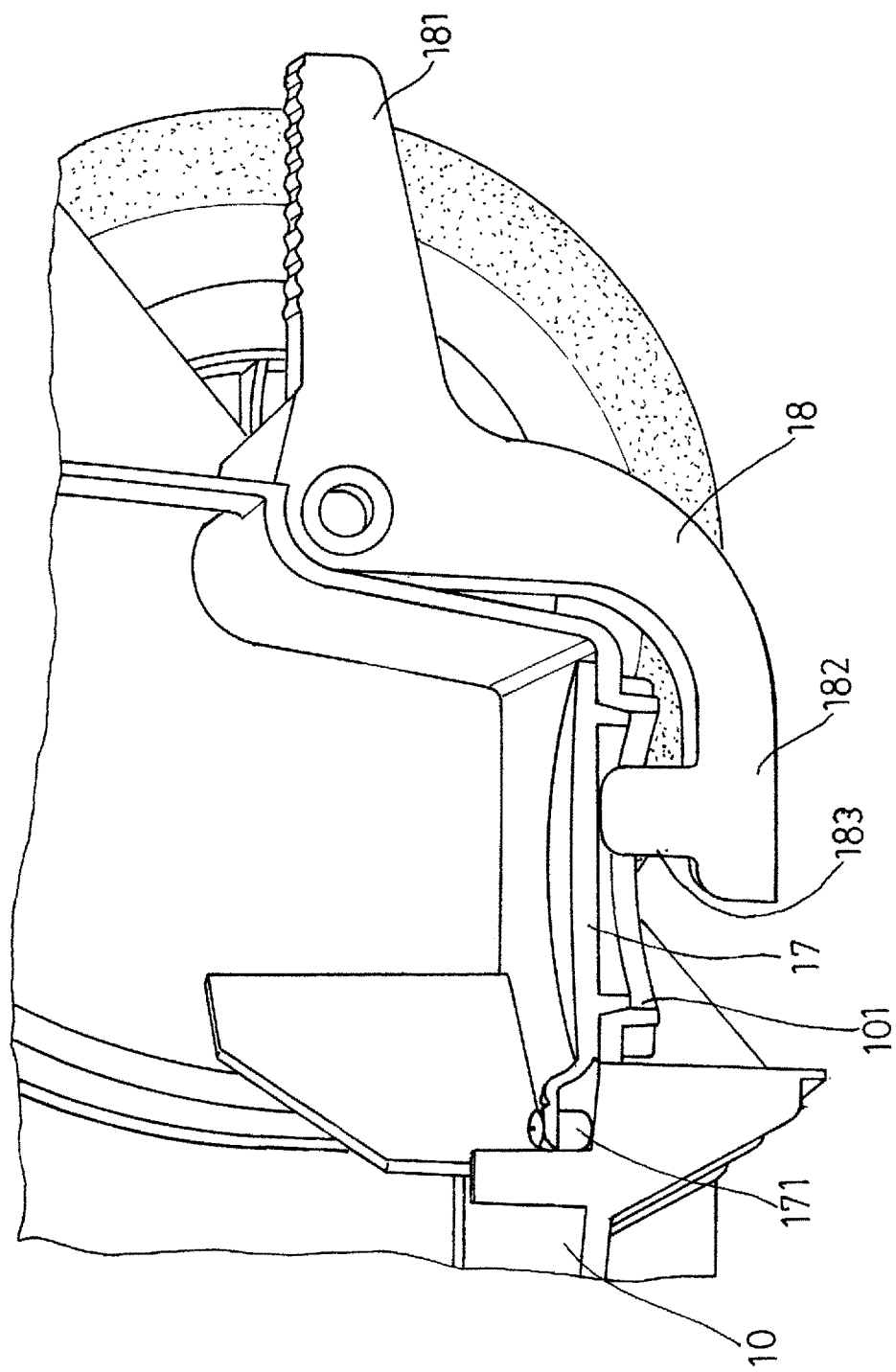
FIG. 5 is an illustration showing the structure and movement of the drain valve of the present invention.
Figure 6:
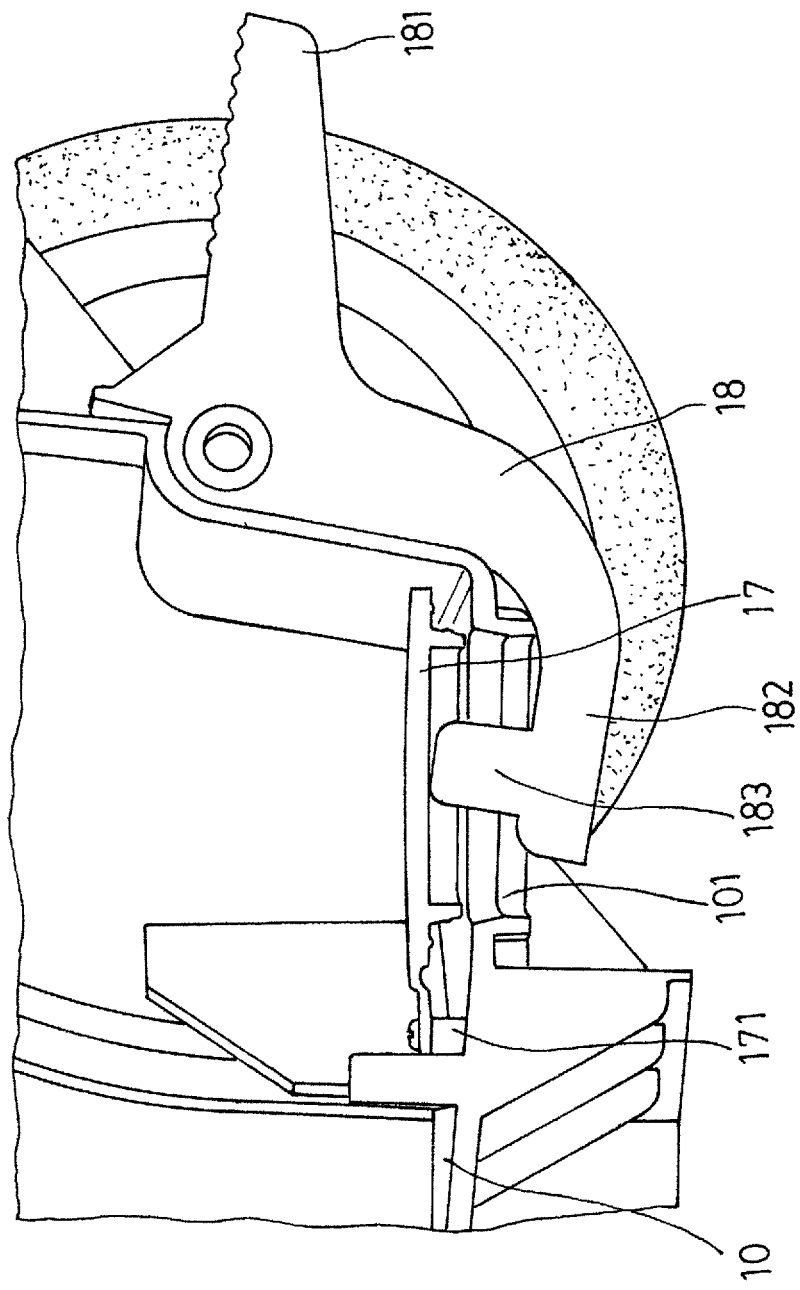
FIG. 6 is another illustration showing the structure and movement of the drain valve of the present invention.
Figure 7:
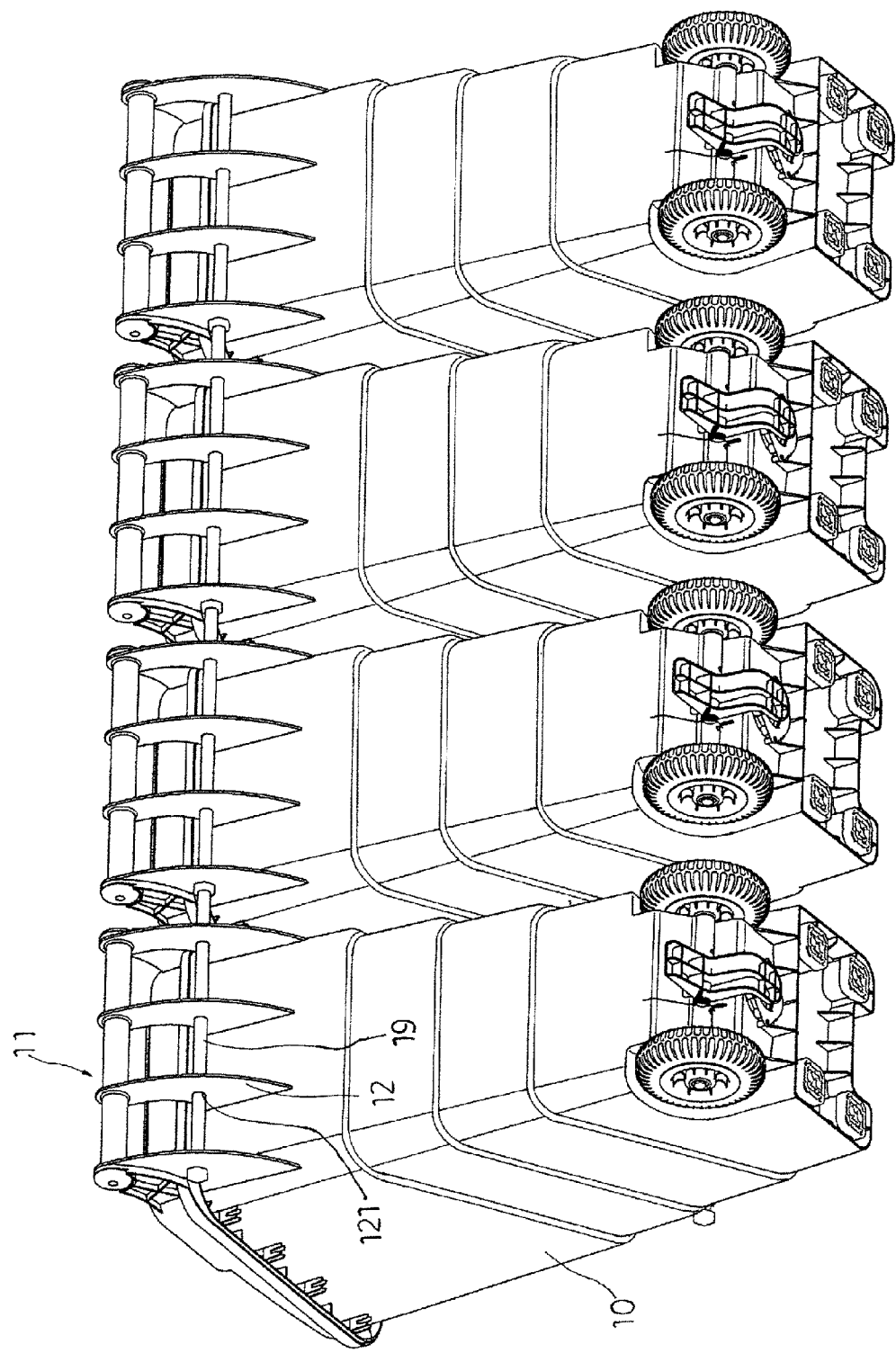
FIG. 7 is an illustration showing a state of use of the present invention combined in series.
Figure 8:
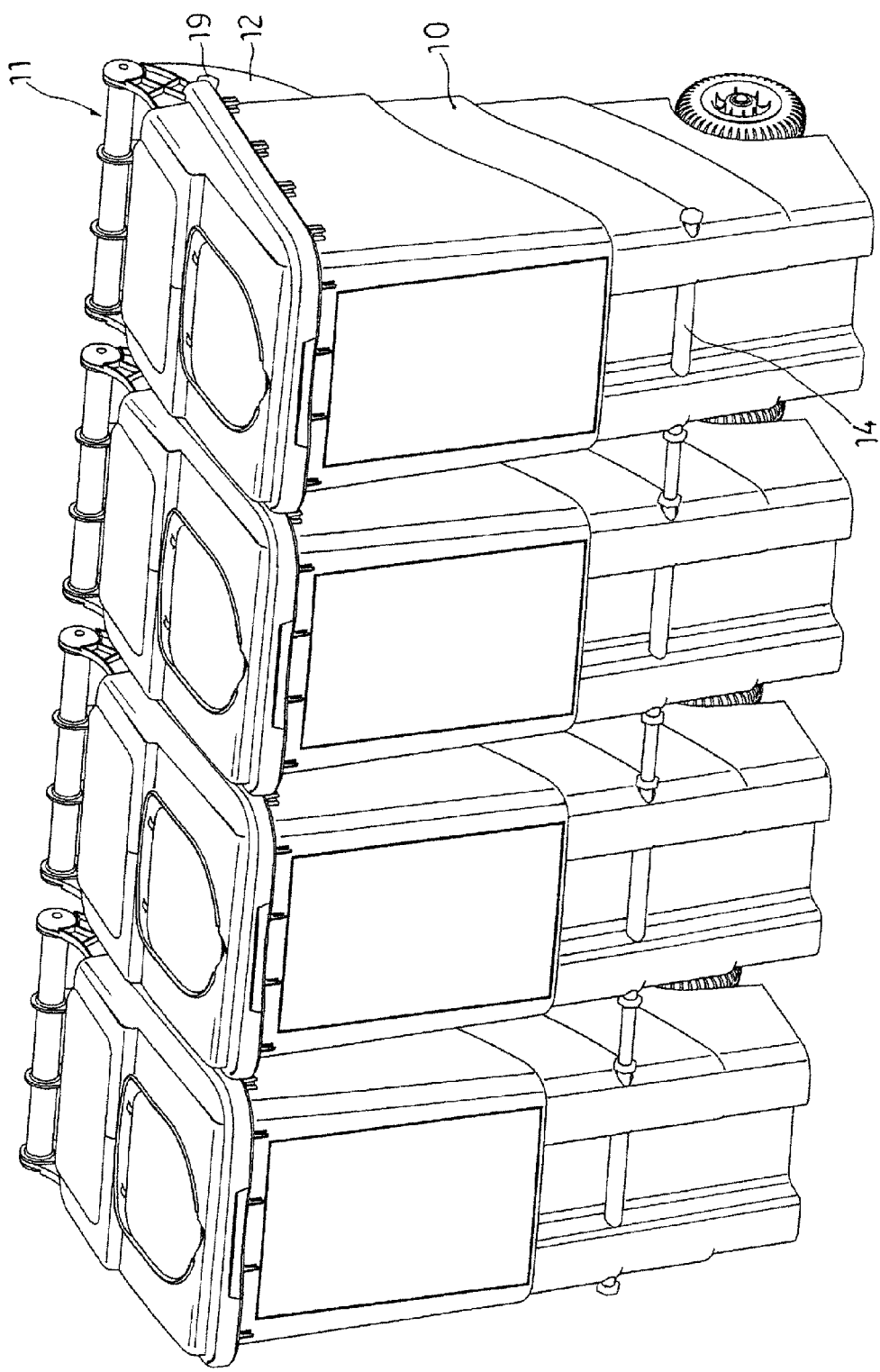
FIG. 8 is another illustration showing a state of use of the present invention combined in series.

Please refer now to FIGS. 2 to 6. As shown in the figures, according to the preferred embodiment of the present invention, the complex deodorizing trash can comprises a housing cover 20 provided with a lifting cap 21 having a dispose opening 202 designed to be of a smaller opening in size to allow the dispose of garbage of relatively smaller sizes such that it is more convenient to users of younger and elder ages. Furthermore, the housing cover 20 comprises an air vent 203 equipped with a gas filter 23 with a nano-silver coating thereon in addition to that a cover board 22 is further provided to cover the air vent 203, mainly designed for the collection of kitchen garbage and waste, such that by closing the cover board 22 tightly during normal uses, the gas filter 23 is able to exhaust the unpleasant odor out of the trash can and to prevent the breeding of bacteria and whereas by opening the cover board 22 and with the air flow generated via pressure difference of positive and negative air pressures, the extraction of gas via a vacuum recycling method provided by such as vacuum cleaning trucks out of the trash can into the sealed container of such large vacuum cleaning trucks can be advantageously achieved to prevent the spreading of the unpleasant odor outside as well as possible pollutions. Also, a front side of the main housing is provided with a slip-preventing rod 14 to prevent accidental slipping of the man housing 10 of the trash can into a hook-to-dispose type of garbage truck during the pickup of the trash can for garbage dispose. In addition, to allow the movement of the trash can with ease, the bottom of the main housing is equipped with the wheels 15. In order to prevent any sliding of the main housing 10 due to the force of the wind or to the tilt of the ground during its use on the ground, slip-preventing pad 16 are provided at the bottom surface of the main housing 10 and adjacent to the front portion thereof such that the main housing 10 can be moved with ease by tilting it slightly rearward. The rear portion of the bottom of the main housing 10 is provided with a drainage opening 101 to facilitate the cleaning process of the trash can. As shown in FIG. 5 and FIG. 6, during normal use and cleaning of the trash can, the magnetic-protruding-type drain valve 17 is sealed to cover the drainage opening 101 tightly with the magnet 171; whereas after the cleaning, one only needs to step down on the foot pedal 181 of the foot pedal protruding-type lift actuator 18 to generate a rotation such that the protruding rod 183 of the lifting plate 182 is driven to move upward to lift up the drain valve 17 and to open up the drainage opening 101 for water drainage out of the trash can. The structural design of the attachment holes 121 provided on the push mechanism at the top of the rear portion of the main housing 10 is not only unique but also with great advantages, as shown in FIG. 7 and FIG. 8, to allow two or more main housings 10 of the complex deodorizing trash cans of the present invention to be combined in series via the attachment holes 20 on each one of the trash cans with a connecting rod 19, or via the attachment of the anti-fall rod 14 provided on the front side of each one of the main housing of the trash can, in order to form a complex trash can combination with a varying number of trash cans to facilitate different uses and applications of the trash cans for various types of garbage, kitchen waste and the recycling processes thereof.

What is claimed is:

1. A complex deodorizing trash can, comprising: a main housing, a push mechanism, at least one wheel, at least one slip-preventing pad, a drain valve, a lift actuator, a housing cover, a lifting cap and a cover board; said main housing comprising an opening on a top thereof and said push mechanism secured to a rear of said main housing and adjacent to a top end thereof; said push mechanism comprising a plurality of securement slats spaced apart from each other and secured onto said main housing; each one of said securement slats comprising an attachment hole arranged on a same location of each one of said securement slats; a top end of each one of said securement slats is attached to a push rod; a front side of said main housing is provided with a slip-preventing rod; said at least one wheel mounted with an axle onto a rear side at a bottom of said main housing; said at least one slip-preventing pad provided in multiple and attached to a bottom surface of said main housing; said drain valve comprising a magnet provided on a circumferencing edge thereof to cover a drainage opening provided on said bottom surface of said main housing and to form a magnetic protruding sealing cap; said lift actuator configured to be of a foot pedal protrusion type, pivotally attached to a central portion of said axle of said at least one wheel and comprising a foot pedal horizontally extended from a top end toward a rear thereof and a lifting plate horizontally extended from a bottom end toward a front thereof; said lifting plate comprising a protruding rod formed on a top surface thereof and abutting a bottom surface of said drain valve; a rear of said housing cover comprising an attachment board respectively formed on two sides thereof and pivotally attached to said main housing to cover a top surface of said main housing and to form of a rotate-to-flip configuration thereon; said housing cover comprising a smaller dispose opening provided at a front portion thereof and said lifting cap moveably attached thereto for covering said dispose opening; said housing cover further comprising an air vent provided on a top surface and adjacent to a rear portion thereof; said air vent comprising a gas filter with a nano-silver coating thereon and a cover board covering thereon such that a complete assembly of a single unit of said trash can is achieved.

2. The complex deodorizing trash can according to claim 1, wherein said attachment holes of said push mechanism at said rear of said main housing are configured to allow said single unit of said trash can to combine two or more said trash cans together in a series with a connecting rod via said attachment holes formed thereon; and wherein an anti-fall lever rod provided on a front of each one of said single unit of said trash can is configured to be attached to each other such that a complex trash can combination set with a varying number of said trash can is achieved to facilitate a recycling process of various types of garbage and kitchen waste.

* * * * *